United States Patent
Meruva

(10) Patent No.: US 12,513,213 B2
(45) Date of Patent: Dec. 30, 2025

(54) SYSTEM AND METHOD OF MANAGING OPERATION OF WIRELESS SOCKETS

(71) Applicant: Honeywell International Inc., Charlotte, NC (US)

(72) Inventor: Jayaprakash Meruva, Bangalore (IN)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 0 days.

(21) Appl. No.: 18/679,489

(22) Filed: May 31, 2024

(65) Prior Publication Data

US 2025/0286928 A1    Sep. 11, 2025

(51) Int. Cl.
| | |
|---|---|
| G06F 15/173 | (2006.01) |
| H01R 13/66 | (2006.01) |
| H04L 67/00 | (2022.01) |
| H04L 67/12 | (2022.01) |

(52) U.S. Cl.
CPC ......... *H04L 67/12* (2013.01); *H01R 13/6691* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 2016/0261425 A1* | 9/2016 | Horton | H04L 67/535 |
| 2017/0010618 A1* | 1/2017 | Shashua | G01C 21/3644 |
| 2018/0321666 A1* | 11/2018 | Cella | G05B 19/4185 |
| 2019/0364492 A1* | 11/2019 | Azizi | H04L 67/12 |
| 2021/0374391 A1* | 12/2021 | Jorasch | G06V 40/19 |
| 2021/0399911 A1* | 12/2021 | Jorasch | H04L 12/1818 |

* cited by examiner

*Primary Examiner* — Phuoc H Nguyen
(74) *Attorney, Agent, or Firm* — ALSTON & BIRD LLP

(57) ABSTRACT

A system and a method of managing operational compliance of wireless sockets is described. The method includes accessing a space model, an equipment model, and compliance rules applicable for the site. The space model provides mapping of the site with a plurality of wireless sockets, and the equipment model provides mapping of the plurality of wireless sockets with electrical powered devices. Operational data of the wireless sockets is obtained and compared with the compliance rules for identifying non-compliance of one or more rules. One or more recommendations are provided to obviate the non-compliance of the one or more rules.

18 Claims, 8 Drawing Sheets

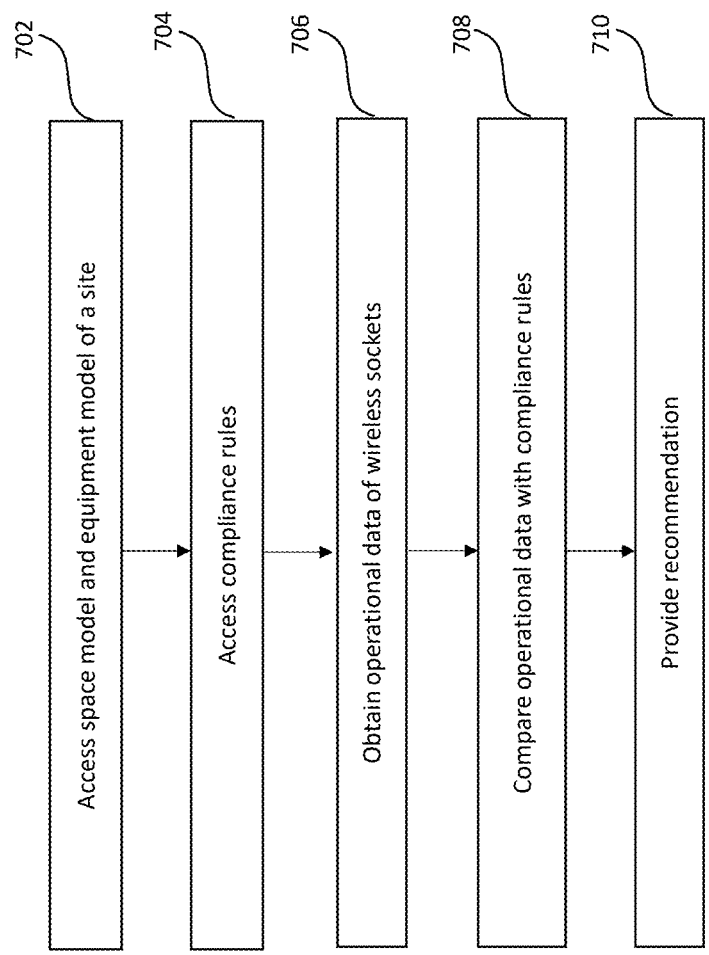

SYSTEM AND METHOD OF MANAGING OPERATION OF WIRELESS SOCKETS

TECHNICAL FIELD

Present disclosure relates to wireless sockets, and more specifically relates to automating operation of wireless sockets.

BACKGROUND

Wireless sockets have capability of receiving user instructions wirelessly for altering the operational state (ON/OFF) instead of requiring manual efforts. The wireless sockets also have the capability of providing information about electrically powered loads i.e. appliances connected with and deriving power from the wireless sockets. For having such capabilities, wireless sockets are finding increased usage in household and industrial environments.

Several standards, such as Title24/IECC2021/ASHRAE 90.1 are defined by multiple agencies for achieving energy efficiency in usage of wireless sockets. As part of these standards, there are several compliance requirements to be met for the wireless sockets. Also, as per different energy codes, the wireless sockets and supported sub-systems provide different features to meet predefined requirements. However, in conventional approaches, the compliance or predefined requirements are verified and configured manually during project engineering and commissioning. Such manual operation is time consuming and prone to errors. If an installer or commissioning engineer makes any error, he must re-commission the missing elements.

Thus, there is a need of a system and a method of automatically provisioning and managing wireless sockets, for elimination manual efforts and preventing implementation errors.

SUMMARY OF THE INVENTION

The present invention relates to a method of managing operational compliance of wireless sockets. The method comprises accessing a space model and an equipment model of a site. The space model provides mapping of the site with a plurality of wireless sockets, and the equipment model provides mapping of the plurality of wireless sockets with electrical powered devices. The method further comprises accessing compliance rules applicable for the site. The method further comprises obtaining operational data of the plurality of wireless sockets. The operational data comprises at least one of current, voltage, power consumption, time of operation, peak value of power consumption and associated timings, socket temperature, socket health status, and alarms for crossing threshold values. The method further comprises comparing the operational data with the compliance rules for identifying non-compliance of one or more rules. The method further comprises providing one or more recommendations to obviate the non-compliance of the one or more rules.

In one aspect, the one or more recommendations include installation of wireless sockets at one or more locations identified from the space model.

In one aspect, the one or more recommendations includes changing an operating state of one or more of the plurality of wireless sockets at one or more locations identified from the equipment model.

In one aspect, the space model comprises details of layout of the site and the equipment model comprises position of electrically powered devices present on the site, and the position of the plurality of wireless sockets installed on the site.

In one aspect, the compliance rules applicable for the site include one or more of areas in which wireless sockets should be installed, minimum coverage of the wireless sockets, deactivation of the wireless sockets upon occupancy of the site by individuals lesser than a predefined count, deactivation of the wireless sockets after a predefined time period when all individuals exit the site, and deactivation of the wireless sockets based on a holiday plan.

In one aspect, the method further comprises generating a report indicating failure or success of implementation of the one or more compliance rules, based on the one or more recommendations.

In one aspect, the method further comprises receiving a user input for remotely changing the operational state of one or more of the plurality of wireless sockets.

In one aspect, the method further comprises updating the compliance rules based on a change in one or more of the space model and the equipment model.

A system for managing operational compliance of wireless sockets is described. The system comprises a processor and a memory storing program instructions which, when executed by the processor, causes the processor to perform several functions. The processor accesses a space model and an equipment model of a site. The space model provides mapping of the site with a plurality of wireless sockets, and the equipment model provides mapping of the plurality of wireless sockets with electrical powered devices. The processor also accesses compliance rules applicable for the site. Also, the processor obtains operational data of the plurality of wireless sockets. The operational data comprises at least one of current, voltage, power consumption, time of operation, peak value of power consumption and associated timings, socket temperature, socket health status, and alarms for crossing threshold values. The processor compares the operational data with the compliance rules to identify non-compliance of one or more rules. The processor provides one or more recommendations to obviate the non-compliance of the one or more rules.

In one aspect, the one or more recommendations include installation of wireless sockets at one or more locations identified from the space model or changing an operating state of one or more of the plurality of wireless sockets at one or more locations identified from the equipment model.

In one aspect, the space model comprises details of layout of the site and the equipment model comprises position of electrically powered devices present on the site, and the position of the plurality of wireless sockets installed on the site.

In one aspect, the compliance rules applicable for the site include one or more of areas in which wireless sockets should be installed, minimum coverage of the wireless sockets, deactivation of the wireless sockets upon occupancy of the site by individuals lesser than a predefined count, deactivation of the wireless sockets after a predefined time period when all individuals exit the site, and deactivation of the wireless sockets based on a holiday plan.

In one aspect, the processor is generates a report indicating failure or success of implementation of the one or more compliance rules, based on the one or more recommendations.

In one aspect, the processor receives the operational data from one or more gateway controllers connected with the plurality of wireless sockets via one or more connected hubs.

In one aspect, the one or more connected hubs are network devices configured to provide the operational instructions of the plurality of wireless sockets.

In one aspect, the one or more connected hubs is connected with the one or more gateway controllers using a wired connection.

In one aspect, the one or more connected hubs communicate with the one or more gateway controllers using a network protocol.

In one aspect, the network protocol is Building Automation and Control Networks (BACnet) protocol.

In one aspect, the processor receives a user input for remotely changing the operational state of one or more of the plurality of wireless sockets.

A non-transitory computer-readable storage medium storing program instructions for managing operational compliance of wireless sockets is described. The instructions, when executed, perform several steps including accessing a space model and an equipment model of a site. The space model provides mapping of the site with a plurality of wireless sockets, and the equipment model provides mapping of the plurality of wireless sockets with electrical powered devices. The instructions further perform accessing compliance rules applicable for the site. The instructions further perform obtaining operational data of the plurality of wireless sockets. The operational data comprises at least one of current, voltage, power consumption, time of operation, peak value of power consumption and associated timings, socket temperature, socket health status, and alarms for crossing threshold values. The instructions further perform comparing the operational data with the compliance for identifying non-compliance of one or more rules. The instructions further perform providing one or more recommendations to obviate the non-compliance of the one or more rules.

BRIEF DESCRIPTION OF THE DRAWINGS

The accompanying drawings constitute a part of the description and are used to provide further understanding of the present disclosure. Such accompanying drawings illustrate the embodiments of the present disclosure which are used to describe the principles of the present disclosure. The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings:

FIG. 7 illustrates a flow chart of a process of managing operational compliance of wireless sockets, in accordance with an embodiment of the present disclosure.

DETAILED DESCRIPTION OF THE INVENTION

The present disclosure provides a system and a method of managing operational compliance of wireless sockets. For managing the operational compliance of wireless sockets, the system accesses a space model and an equipment model of a site. The space model provides mapping of the site with a plurality of wireless sockets, and the equipment model provides mapping of the plurality of wireless sockets with electrical powered devices. The system also accesses compliance rules applicable for the site. Further, the system obtains operational data of the plurality of wireless sockets. The operational data comprises at least one of current, voltage, power consumption, time of operation, peak value of power consumption and associated timings, socket temperature, socket health status, and alarms for crossing threshold values. The system compares the operational data with the compliance rules to identify non-compliance of one or more rules. For obviating the non-compliance of the one or more rules, the processor provides one or more recommendations to a user/operator.

Figure 1:
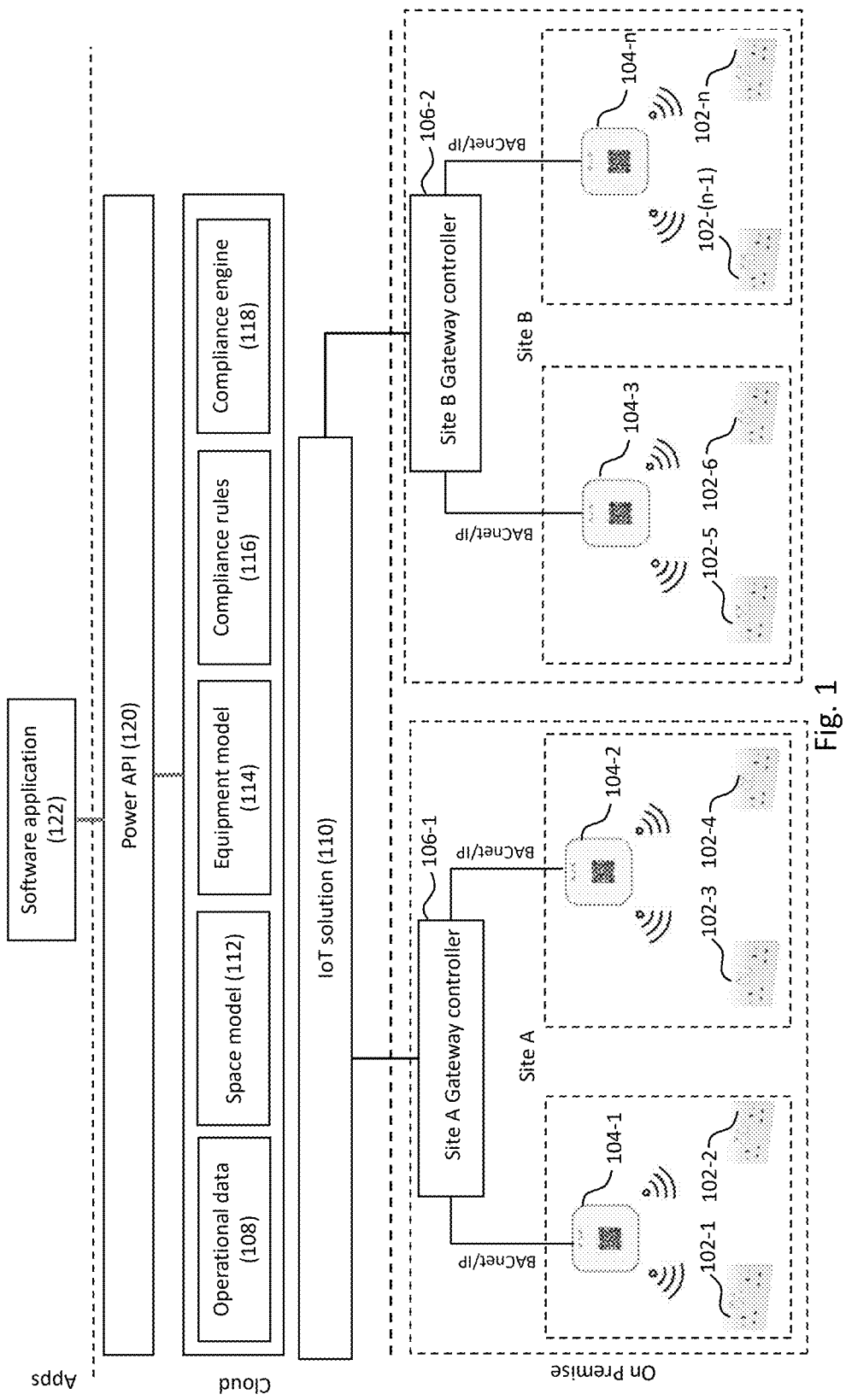
FIG. 1 illustrates a layered network architecture of a system for managing operational compliance of wireless sockets, in accordance with an embodiment of the present disclosure.

FIG. 1 illustrates a layered network architecture of a system for managing operational compliance of wireless sockets, in accordance with an embodiment of the present disclosure. Several wireless sockets 102 may be installed in different environments, such as residential, office, or industrial environments. Wireless sockets 102, also known as smart sockets, connected sockets, or smart plugs, provide a convenient way to remotely control and automate electrical devices and appliances. They typically connect to a Wi-Fi network or other wireless protocols, allowing users to control them via a smartphone app or voice commands. A few common types of the wireless sockets 102 which can be managed by present system are mentioned below.

i) Mira Mesh Smart Sockets: These sockets utilize LumenRadio's wireless mesh network offering ultra-reliable connectivity using frequency hopping algorithms and self-healing mesh routing protocols, for avoiding disturbance and finding most efficient data path. Mira Mesh enables running a battery-operated wireless mesh for multiple years.

ii) Wi-Fi Smart Sockets: These sockets connect directly to a Wi-Fi network, allowing users to control them using a smartphone app from anywhere with an internet connection. They often support features like scheduling, timers, and voice control via platforms like Amazon Alexa or Google Assistant.

iii) Bluetooth Smart Sockets: Bluetooth-enabled sockets communicate directly with smartphones or tablets via Bluetooth technology. While they may offer similar functionality to Wi-Fi sockets, they typically have a shorter range and require the user to be in proximity to the socket for control.

iv) Zigbee Smart Sockets: Zigbee is a low-power wireless communication protocol commonly used in smart home devices. Zigbee smart sockets can be integrated into Zigbee-based smart home ecosystems, allowing for centralized control and automation of multiple devices.

v) Z-Wave Smart Sockets: Z-Wave is another wireless protocol used for smart home devices. Z-Wave smart sockets can communicate with a central Z-Wave hub or controller, enabling remote control and automation alongside other Z-Wave compatible devices.

vi) Infrared (IR) Smart Sockets: These sockets use infrared technology to communicate with remote controls or smartphones. While less common than Wi-Fi or Bluetooth sockets, they can be useful for controlling devices that use IR remote controls, such as TVs, air conditioners, and audio systems.

vii) Powerline Smart Sockets: Powerline communication (PLC) sockets use existing electrical wiring in buildings to transmit data signals. They can be useful in environments where Wi-Fi signals are weak or unreliable, providing a stable and secure communication channel for smart home devices.

viii) Outdoor Smart Sockets: Designed for outdoor use, these sockets are weatherproof and often feature rugged construction to withstand harsh environmental conditions. They can be used to control outdoor lighting, garden equipment, or holiday decorations.

ix) Energy Monitoring Smart Sockets: Some smart sockets include built-in energy monitoring capabilities, allowing users to track and analyze the energy consumption of connected devices. This information can help users identify energy-saving opportunities and optimize their energy usage.

x) Multi-Outlet Smart Sockets: Multi-outlet smart sockets feature multiple sockets in a single device, allowing users to control multiple devices or appliances simultaneously. They can be useful for managing power distribution and reducing clutter in smart home setups.

xi) Smart Power Strips: Smart power strips combine multiple smart sockets with traditional power strip functionality, providing surge protection and additional outlets for connecting devices. They are suitable for powering and controlling multiple devices in home entertainment centers, home offices, or workshops.

The wireless sockets 102 may be installed for powering different electrical appliances, such as Heating, Ventilation, and Air Conditioning (HVAC) unit, Air Handling Unit (AHU), boiler, chiller, cooling tower, geyser, Electric Vehicle (EV), luminaire, air purifier, electric meter, exhaust plant, fan coil unit, gas meter, heat pump, roof top unit, variable air volume unit, and water meter. It should be understood that the above mentioned list is non-exhaustive and any other electrical or electronic appliance not mentioned above could also be connected with the wireless sockets 102, in different implementations. The wireless sockets 102 (collective label for 102-1 through 102-n) installed in a particular area or location may be wirelessly connected with a connected hub 104 (collective label for 104-1 through 104-n). For example, wireless sockets 102-1 and 102-2 present at a first location may be connected with a first connected hub 104-1, wireless sockets 102-3 and 102-4 present at a second location may be connected with a second connected hub 104-2, wireless sockets 102-5 and 102-6 present at a third location may be connected with a third connected hub 104-3, and wireless sockets 102-(n−1) and 102-n present at an nth location may be connected with an nth connected hub 104-n. In this manner, each wireless socket may be connected with a connected hub present in vicinity. Further, it should be understood that only two wireless sockets 102 are shown to be connected with each connected hub 104 merely for the ease of illustration, and a higher number of wireless sockets may be connected with any connected hub 104 depending on its capability.

The connected hub 104 can be understood as a network device configured to provide operational (ON/OFF) instructions to the wireless sockets 102 and receive operational data of electrical appliances powered using the wireless sockets 102. The operational data may include, but not limited to, current, voltage, and power consumption, time of operation, peak values of power consumption and associated timings.

In different implementations, the operational data may include the details listed below.

i) Socket health status: a parameter indicating online/offline status of wireless sockets.
ii) Alarms: an indicator of wireless sockets and outlet points.
iii) Schedule display: a parameter indicating schedules, for example weekly schedules and special holiday event schedules for socket outlets.
iv) Energy consumption: a parameter indicating amount of energy consumed by an electrical device connected with a wireless socket over a period of time, for example expressed in kWh.
v) Firmware: a parameter indicating type and version of a firmware running on a wireless socket.
vi) Mode of operation: a parameter for indicating current mode of a socket outlet, and for commanding left and right outlets of a wireless socket to change mode of operation between ON, OFF, and Lock.
vii) Socket outlet alarm actions: a parameter for setting socket outlet alarm to one of no action/OFF/ON/Lock OFF/Lock ON when outlet of a wireless socket raises high or low power alarm.
viii) Power and current: a parameter useable for below listed purposes
Reading instantaneous load current in mA from left and right outlets of sockets.
Reading instantaneous load real power in Watts from left and right outlets of socket.
Measuring instantaneous socket temperature in degree C.
Setting low and high power thresholds for left and right outlets so that system will raise alarms when the thresholds are crossed.
Setting temperature high threshold so that alarms are raised when temperature of sockets cross the threshold.
Setting high and low alarm delay in seconds to introduce such time period before raising an alarm when threshold is crossed.

Each connected hub 104 may be connected with a gateway controller 106. As shown in FIG. 1, the first connected hub 104-1 and the second connected hub 104-2 are connected with a site A gateway controller 106-1, and the third connected hub 104-3 and the nth connected hub 104-n are connected with a site B gateway controller 106-2. In one implementation, one or more connected hubs 104 may be connected with one or more gateway controllers 106 (collective reference) using a wired connection and may communicate using a suitable protocol, such as BACnet.

BACnet is a communication protocol for Building Automation and Control (BAC) networks that use ASHRAE, ANSI, and ISO 16484-5 standards protocol. BACnet is used for controlling data exchange between different devices and components. BACnet offers interoperability between systems and devices used in building automation systems by providing a standardized method of all actions in a network. BACnet requires representation of necessary information as an object accessible over network. Therefore, each object will represent information about a component or device. Representation of information as an object offers an advantage of adding new objects and changing existing objects as per a user's need.

Below table provides details of a device (powered by a wireless socket) whose operational details are communicated using BACnet protocol.

| Object_Name | Current_Drawn |
|---|---|
| Object_Type | DIGITAL OUTPUT |
| Present_Value | 2.2A |
| Status_Flags | ON, OFF |
| High_Limit | 5A |
| Low_Limit | 2A |

A collection of objects performing a specific function is called a BACnet device. All objects must have an identifier, data type i.e., analog or digital value, and additional information such as read-only, modified by other devices, etc. BACnet usually defines a total of 23 standard objects and covers general-purpose functions in a building automation system.

BACnet utilizes a client-server communication model. BACnet deals with sensing of messages between a gateway controller 106 and different devices. When any operational data is required, a client sends a request to a server. The server, in turn, responds with the required operational data, called a server response. Different types of information/services provided using BACNet includes alarm and event services, file access services, object access service, remote device management services, and virtual terminal services.

While using BACnet, the operational data may be communicated over a suitable network technology, such as Ethernet, Lon Talk, ZigBee, ARCnet, and MS/TP.

Each of the one or more gateway controllers 106 may communicate the operational data 108 of electrical appliances powered using the wireless sockets 102 to an Internet of Things (IoT) solution 110. In one implementation, the IoT solution 110 may be implemented over a cloud network. Apart from the operational data 108, the IoT solution 110 may also access other information, such as a space model 112, an equipment model 114, and compliance rules 116 to be followed, for managing operational compliance of the wireless sockets 102. Such other information may be present over the cloud network in one or more storage modules.

Figure 2:
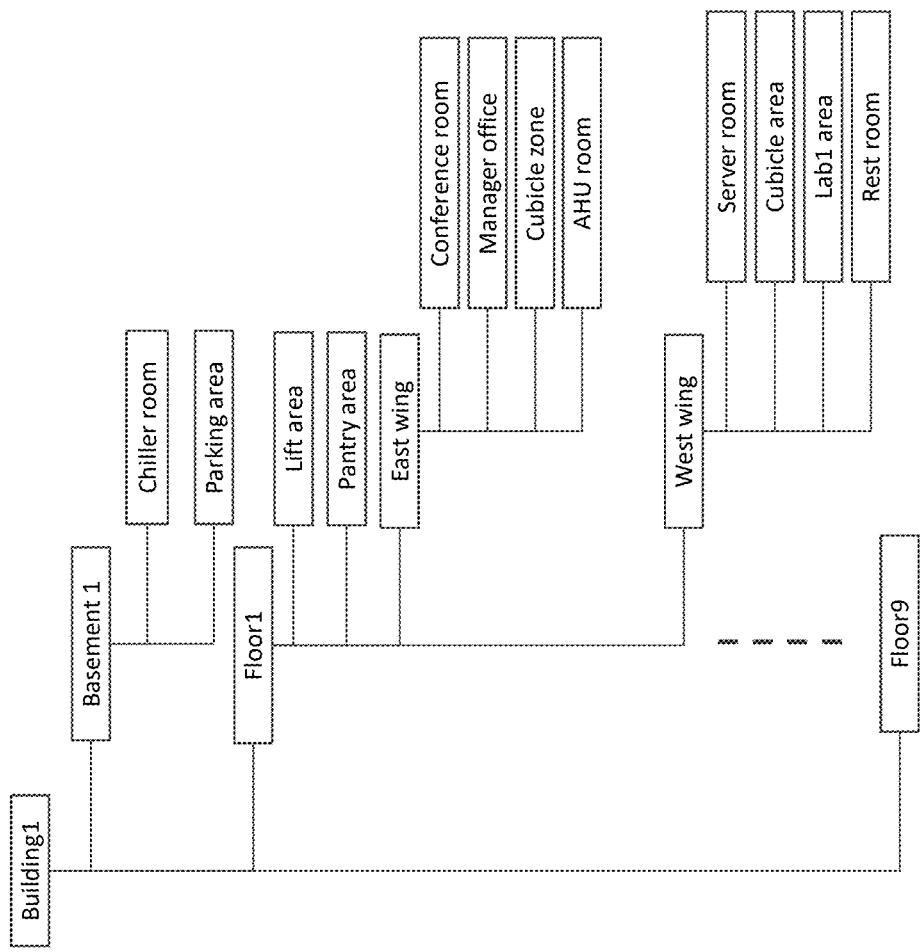
FIG. 2 illustrates an example space model of a building, in accordance with an embodiment of the present disclosure.

The space model 112 may include details of layout of an area/site, such as a floor and position of the wireless sockets 102 and various electrically powered devices present in the area. FIG. 2 illustrates an example space model of a building, in accordance with an embodiment of the present disclosure. As illustrated, building1 includes a basement and floors 1 through 9. A chiller room and a parking area is shown to be present on the basement1. A lift area, pantry area, east wing, and a west wing is present on the floor1. A conference room, manager office, cubicle zone, and an Air Handling Unit (AHU) room is present in the east wing. A server room, cubicle area, Lab1 area, and a rest room are present in the west wing. Similarly, different areas present on other floors would be defined in the space model. In different implementations, the building1 can be represented with multiple hierarchy, such as country at a top level, and region, state, city, facility, and building at lower levels.

Figure 3:
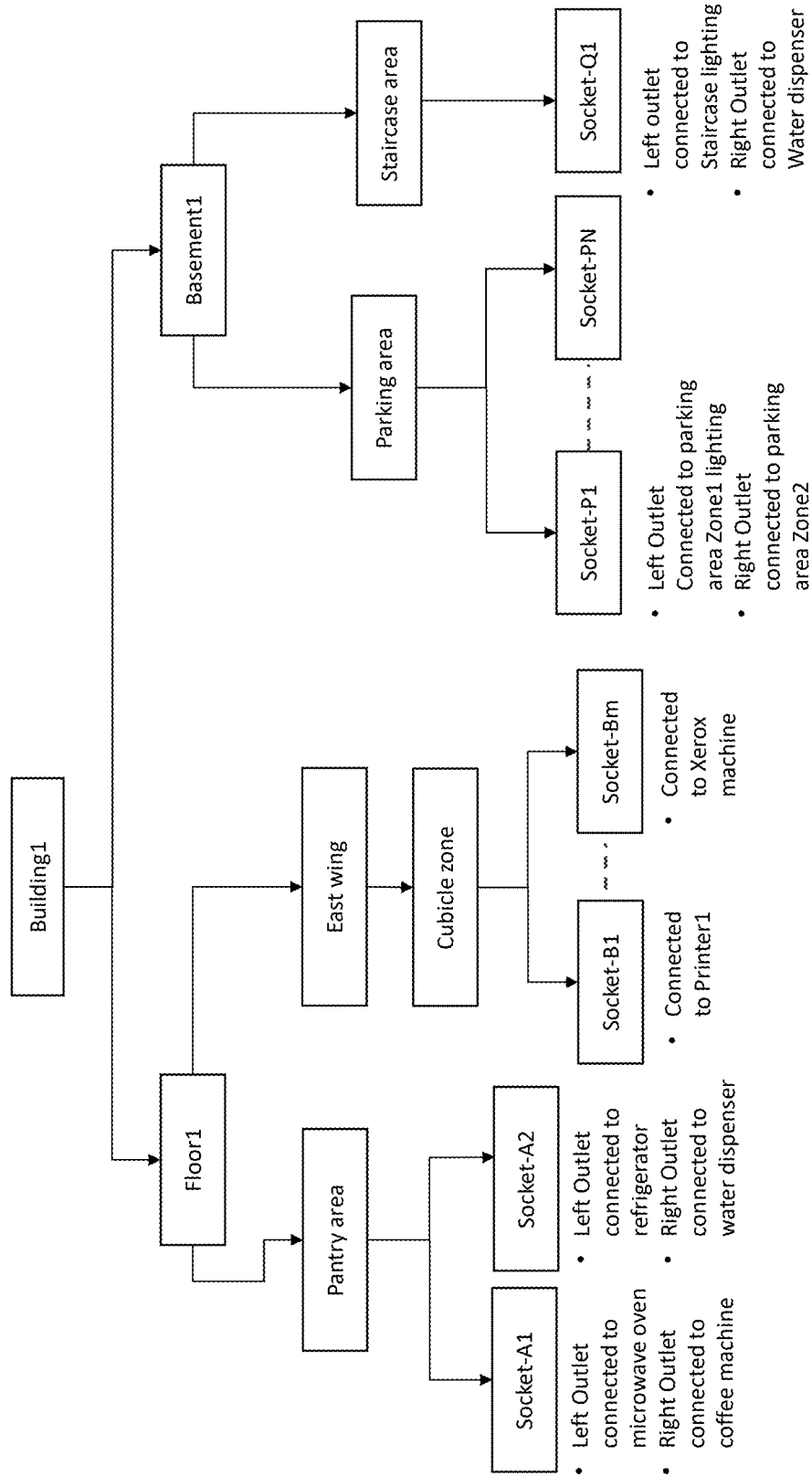
FIG. 3 illustrates an example equipment model of a building, in accordance with an embodiment of the present disclosure.

The equipment model 114 provides mapping of the wireless sockets 102 with electrical powered devices. FIG. 3 illustrates an example equipment model of a building, in accordance with an embodiment of the present disclosure. Similar to the details described with reference to FIG. 2, the equipment model includes details of different areas present in the building. Additionally, the equipment model includes details of wireless sockets installed in different areas. For example, socket A1 and socket A2 are shown to be present in the pantry area of floor1, Socket B1 through socket Bm are shown to be present in the cubicle zone of the east wing, and socket P1 through socket PN are shown to be present in the parking area of the basement1, and socket Q1 is shown to be present in the staircase area of the basement1. The equipment model also includes details of electrical powered devices connected with the sockets. For example, as illustrated, the equipment model stores that a left outlet of the socket A1 is connected to a microwave oven and a right outlet of the socket A1 is connected to a coffee machine. Similarly, the equipment model stores details of different electrical powered devices connected with each socket.

The compliance rules 116 may include a list of measures to be followed to ensure adherence to a particular standard, such as Title24 and IECC2021. In one implementation, the compliance rules 116 may include, but not limited to, the ones listed below:

i) Wireless socket need to be fitted in private offices, lobbies, conference rooms, kitchen areas in office spaces—as specified in Title 24.

ii) Coverage of wireless sockets should be 50% minimum. At least one controlled receptacle must be present within 6 feet distance from each uncontrolled receptacle or a splitwired receptacle must be installed with at least one controlled receptacle and one uncontrolled receptacle—as specified in Title 24.

iii) Control capable of automatically shutting OFF the controlled receptacles when the space is typically unoccupied—as specified in Title 24.

iv) For hotels and motel guest rooms, electric circuits serving controlled receptacles in guestrooms shall have captive card key controls, occupant sensing controls, or automatic controls so the power is switched OFF no longer than 30 minutes after the guestroom has been vacated—as specified in Title 24.

v) An occupant sensor control or an automated signal from another control or alarm system that shall turn OFF receptacles within 20 minutes of all occupants leaving a space—as specified in IECC2021 & ASHRAE 90.1.

vi) An independent program schedule shall be provided for controlled areas of not more than 5,000 sq.ft and not more than one floor—as specified in IECC2021 & ASHRAE 90.1 vii) Special event-holiday shut OFF feature for automatically turning OFF all loads for at least 24 hours and then resuming to a normally scheduled operation in case of holiday—as specified in Title 24.

viii) Manual override of not more than 2 hours should be set. When an automatic time switch control is installed it shall incorporate an override control that allows the controlled receptacle to remain ON for not more than 2 hours when an override is initiated. Therefore, an occupant shall be able to manually override an area for not more than 2 hours—as specified in Title 24.

ix) Demand responsive controls i.e. controlled receptacles in buildings shall be capable of automatically turning OFF all loads connected to the receptacle in response to a demand response signal from a certified OpenADR 2.0b Virtual End Node—as specified in Title 24.

Figure 4:
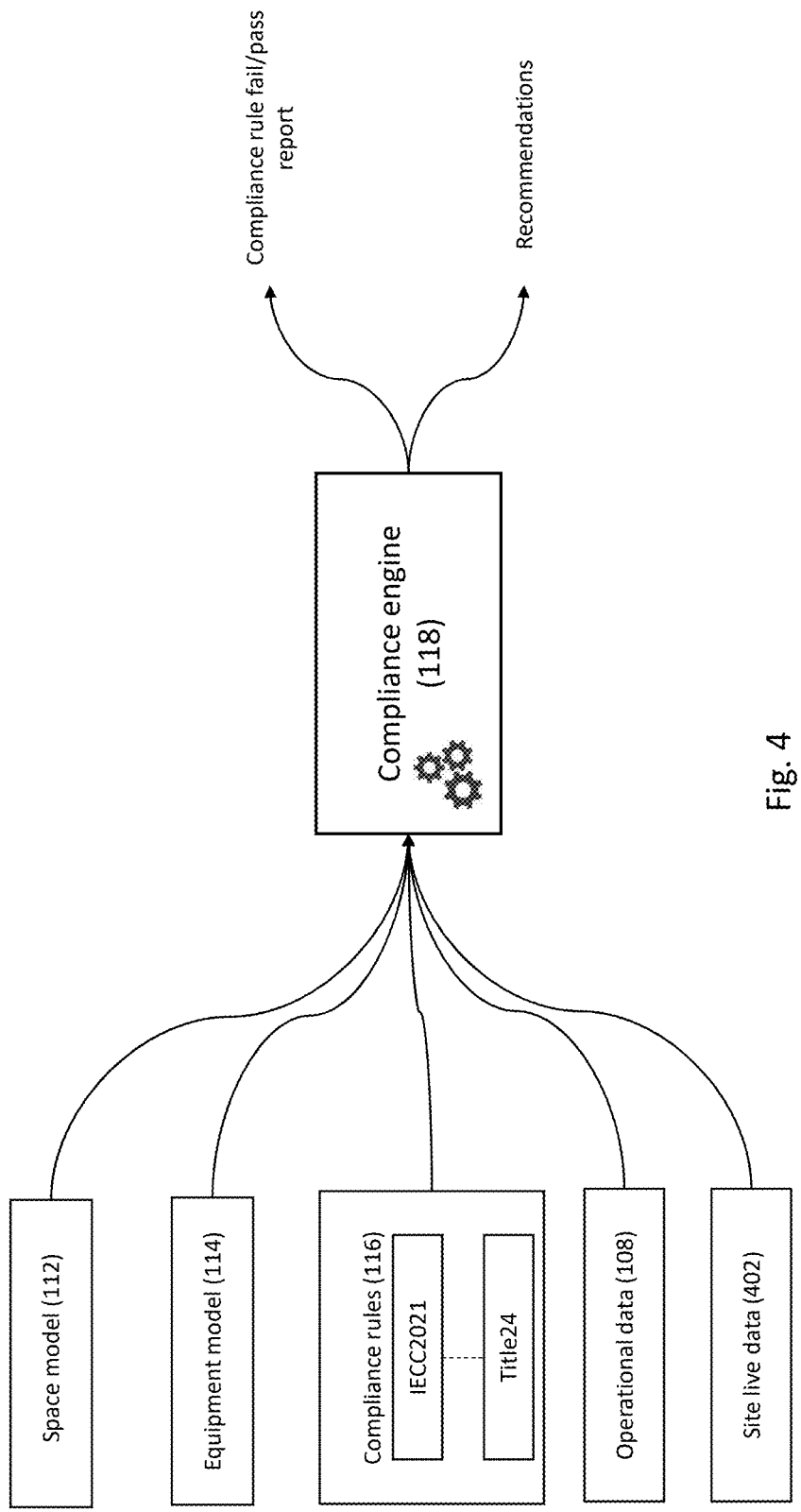
FIG. 4 illustrates a block diagram showing different inputs and outputs of the compliance engine, in accordance with an embodiment of the present disclosure.

The IoT solution 110 may implement a compliance engine 118 for managing operational compliance of the wireless sockets 102 based on processing of the operational data 108, the space model 112, the equipment model 114, and the compliance rules 116. FIG. 4 illustrates a block diagram showing different inputs and outputs of the compliance engine 118, in accordance with an embodiment of the present disclosure. As illustrated, the compliance engine 118 may collect the space model 112, equipment model 114, compliance rules 116, operational data 108, and site live data 402.

The compliance engine 118 processes all collected information and provides compliance rule fail/success report and recommendations. The recommendations may be instructions for an operator to implement, for example turning ON or OFF particular wireless sockets for meeting certain compliance rules. By referring to the compliance rule fail/success report and/or the recommendations, the operator may rectify the deficiencies involved in implementation of the compliance rules.

For example, for each Title24 compliance specification, the compliance engine 118 reads required information for a compliance rule by analyzing model data and set of configurations to decide whether the compliance rule is pass/fail. If the compliance rule is passed, evaluated results along with respective configurations and timestamp are maintained for further report generation. Alternatively, if the compliance rule is failed, necessary changes to be made are recommended to the operator. For example, as per a first rule, smart sockets need to be fitted in private offices, lobbies, conference rooms, and kitchen areas in office spaces. In such scenario, the compliance engine 118 may analyze the space model 112 and the equipment model to determine whether any wireless sockets are installed in said areas and if they are covering 50% of all assets. If not, the system for managing operational compliance of wireless sockets recommends installation of more wireless sockets in remaining areas to meet the 50% compliance rule.

Referring back to FIG. 1, a power Application Programming Interface (API) 120 may be implemented over the cloud network for allowing communication between the IoT solution 110 and a software application 122. The power API 120 is a framework for building software-defined power meters replacing traditional physical power meters. The power API 120 may be implemented using a suitable programming language such as Python. Program library like pyJoules may be used for implementing the power API 120 using Python.

The software application 122 may provide an interface to the operator for viewing recommendations and reports generated by the compliance engine 118. The operator may also access the software application 122 for providing any command i.e. user input for remotely controlling the operational state of any wireless socket 102.

In one implementation, the system for managing operational compliance of the wireless sockets 102 may be configured to automatically implement the compliance rules, without requiring any instruction from the operator. For operating in an automated manner, the system may be configured to fetch the compliance rules and other relevant information and accordingly manage operational state of the wireless sockets 102. Corresponding to each rule, an automation script may be stored over the cloud network.

Further, the system for managing operational compliance of the wireless sockets 102 may make necessary configuration/programming changes after the operator approves a suggested recommendation. Alternatively, when the system is configured to implement suggestions automatically, the system will not wait for the operator's confirmation.

In one scenario, it may be determined that occupancy sensors and wireless sockets are installed in an area, but there does not exist an application configuration to shut OFF receptacles when the area is un-occupied. In such scenario, needed application configurations may be created based on the operator's inputs or an automation script.

In another scenario, an automatic holiday "shut-OFF" feature may require turning OFF all loads for at least 24 hours and then resuming to a normally scheduled operation. Assume that there are no holiday schedule events stored in the system, the system will recommend to provide date of holidays and automatically make schedules to turn OFF loads on the holidays. In yet another solution, the system may analyze the operational data collected for a limited time period and make necessary recommendation to meet a compliance.

In yet another scenario, an occupant may have overridden an area and the operations might have not come into a normal state for more than two hours. In such scenario, the system will immediately suggest, after observing a live scenario, that a required compliance isn't met due to prolonged overriding of the operations.

Figure 5:
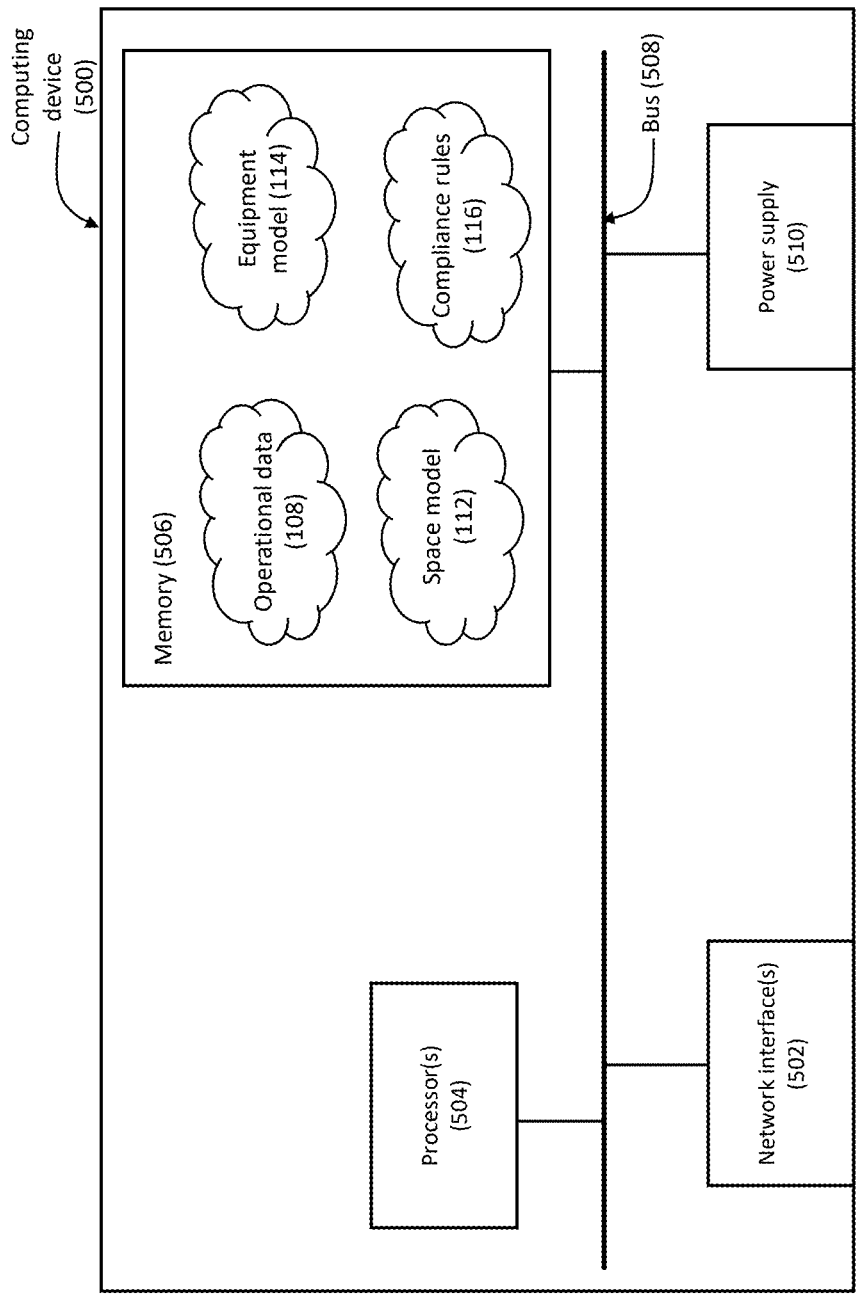
FIG. 5 illustrates a block diagram of an example computing device implemented over cloud network for managing operational compliance of wireless sockets, in accordance with an embodiment of the present disclosure.

FIG. 5 illustrates a block diagram of an example computing device 500 that may be implemented over the cloud network for managing operational compliance of the wireless sockets, in accordance with an embodiment of the present disclosure. The computing device 500 may comprise one or more network interfaces 502 (e.g., wired, wireless, etc.), at least one processor 504, and a memory 506 interconnected by a system bus 508, as well as a power supply 510.

The one or more network interfaces 502 may be used to provide input or fetch output from the computing device 500. The one or more network interfaces 502 may be implemented as a Command Line Interface (CLI) or Graphical User Interface (GUI). Further, Application Programming Interfaces (APIs) may also be used for remotely interacting with edge systems and cloud servers.

The processor 504 may include one or more general purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor), MIPS/ARM-class processor, a microprocessor, a digital signal processor, an application specific integrated circuit, a microcontroller, a state machine, or any type of programmable logic array.

The memory 506 may include, but is not limited to, non-transitory machine-readable storage devices such as hard drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

The memory 506 comprises a plurality of storage locations that are addressable by the processor 504 and the network interfaces 502 for storing software programs and other necessary information (operational data 108, space model 112, equipment model 114, and compliance rules 116) associated with the embodiments described herein. The processor 504 may comprise hardware elements or hardware logic adapted to execute the software programs and manipulate data structures. The compliance engine 118 may be embodied within the processor 504 to process one or more of the operational data 108, space model 112, equipment model 114, and compliance rules 116 for managing operational compliance of the wireless sockets 102, in a manner described heretofore.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Upon implementing the above described methodology, the proposed system is able to provide one or more technical advantages mentioned successively. Present invention provides a closed loop solution that automates the verification of energy compliance standards and automatically configures/engineers system for missing details so that commissioning engineers can spend minimal effort wherever he would like to cross verify certain critical tests or tests are failed. Moreover, present invention enables that generation of the final report is not a separate activity and significantly improves the productivity of commissioning engineers.

Figure 6A:
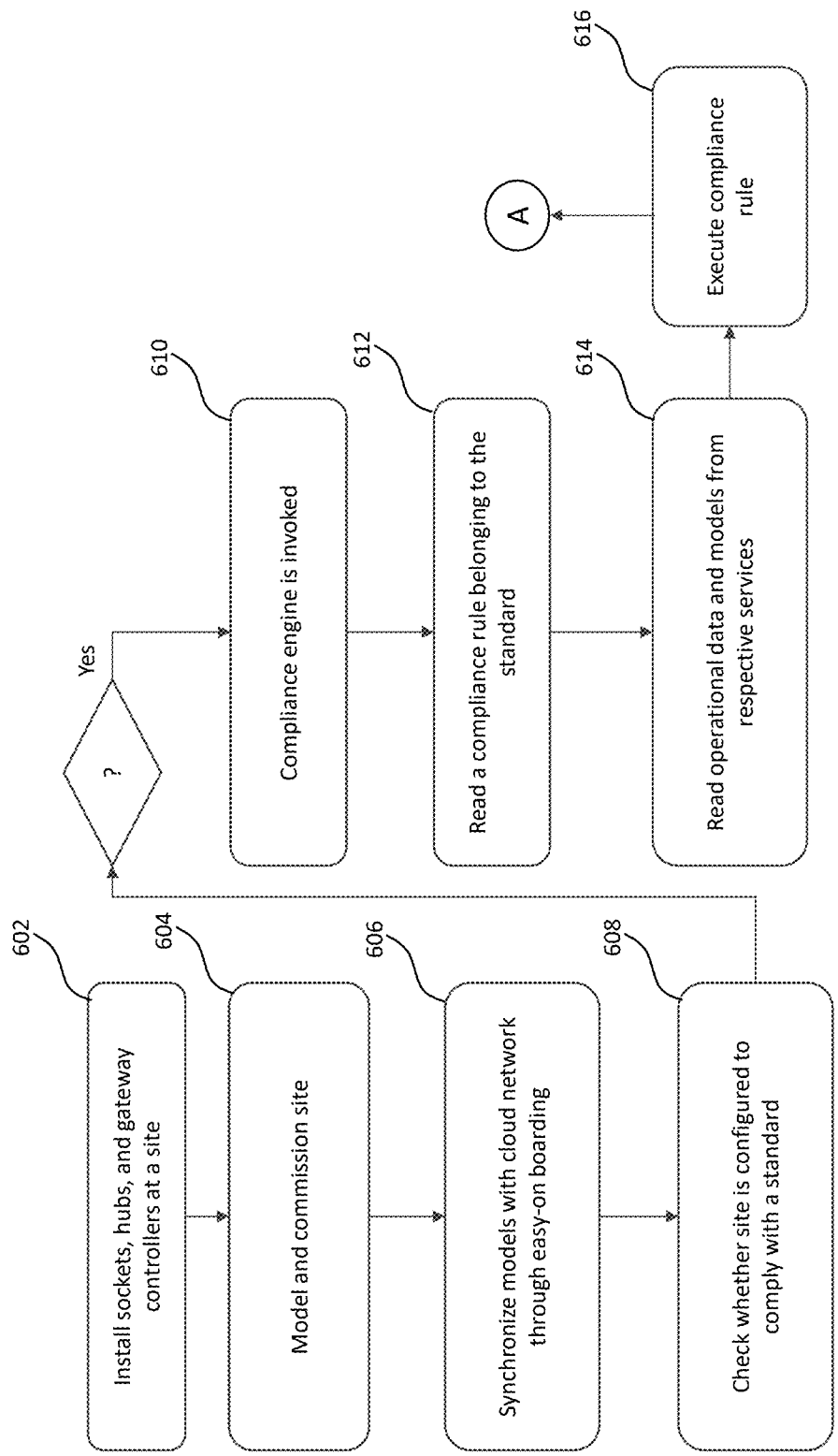
FIGS. 6a and 6b cumulatively illustrate a flow chart of a process of managing operational compliance of wireless sockets, in accordance with an embodiment of the present disclosure.
Figure 6B:
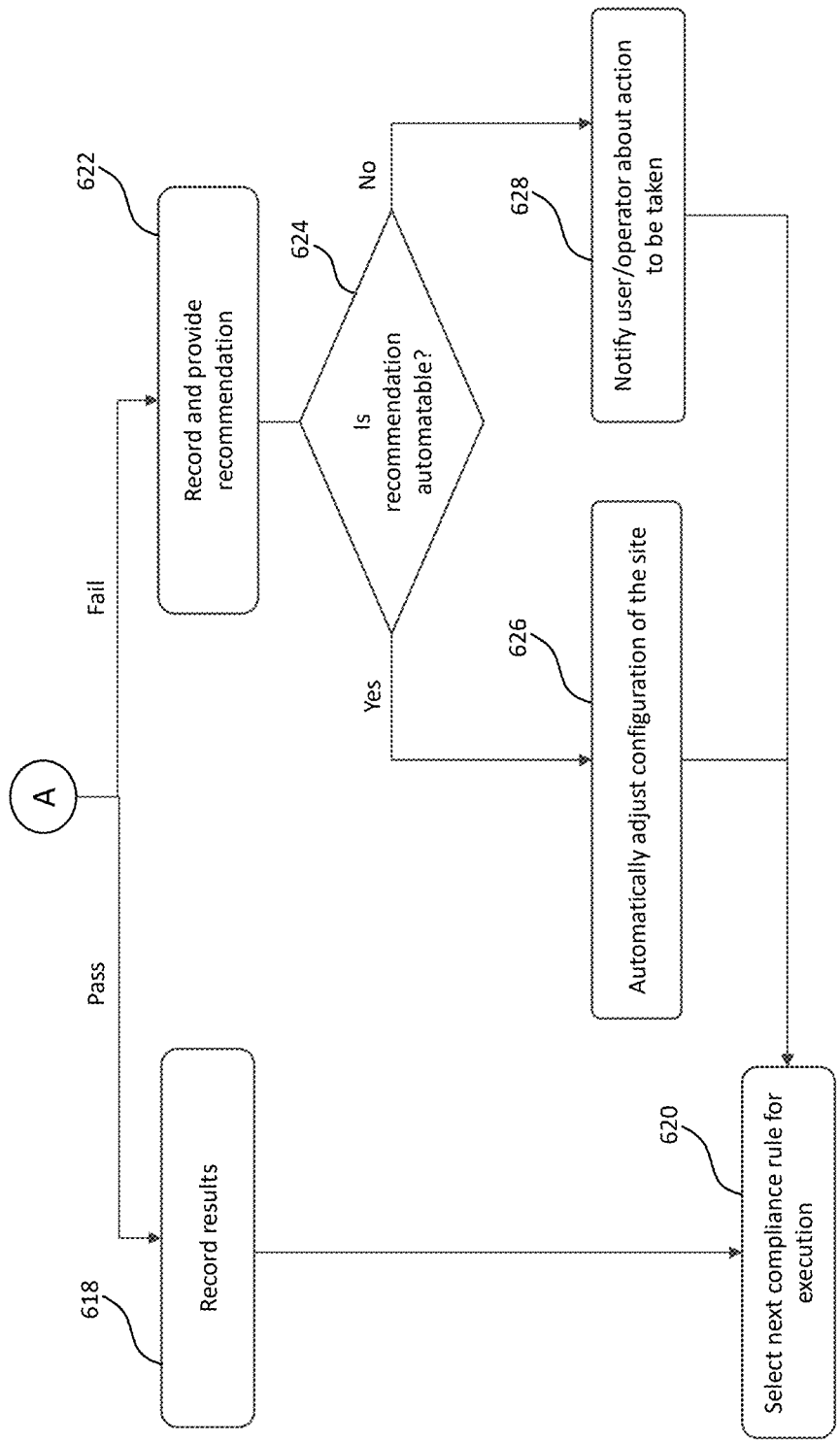

FIGS. 6a and 6b cumulatively illustrate a flow chart of a method of managing operational compliance of wireless sockets, in accordance with an embodiment of the present disclosure. In this regard, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIGS. 6a and 6b may in fact be executed substantially concurrently or the blocks may sometimes be executed in the reverse order, depending upon the functionality involved. Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

At step 602, wireless sockets, connected hubs, and gateway controllers may be installed on a site. Wireless sockets may be installed at sites/locations for powering electrical devices. The wireless sockets may be connected with connected hubs i.e. network devices, via a wireless connection. The connected hubs may be connected with the gateway controllers. The gateway controllers may be configured to communicate with an IoT solution implemented over a cloud network for managing operational compliance of the wireless sockets.

At step 604, the site may be modelled and commissioned. Modeling the site corresponds to structuring and organizing data to represent physical layout, components, and attributes of the site. In one implementation, for modeling the site, following steps may need to be performed:
  i) Identification of entities: Main entities or objects required to be represented are identified. The main entities may include rooms, corridors, doors, windows, equipment, etc.
  ii) Define attributes: For each entity, relevant attributes may need to be defined. For example, a room entity might have attributes like room number, area, purpose, capacity, etc.
  iii) Relationships: Relationships between entities may need to be established. For instance, rooms are typically contained within a building floor, doors connect rooms, windows are part of walls, etc.
  iv) Modeling tool selection: An appropriate modeling tool or software may need to be selected for creating the site/space model. For instance, entity-relationship diagrams (ERDs), UML diagrams, or specialized building information modeling (BIM) software may be used.
  v) Normalization: It may be ensured that the site/space model is properly normalized to reduce redundancy and improve efficiency. This involves organizing data into logical tables and minimizing data duplication.
  vi) Validation: The site/space model may need to be validated against real-world scenarios and requirements.

In the above described manner, an equipment model may also be developed for the site. The equipment model corresponds to a 3D model including details of different equipment present in the site. The equipment may include, for example, air handling units, Variable Air Volume (VAV) units, roof top units, chillers, and Fan Coil Units (FCUs). The details of different equipment may include, but not limited to, name, identity, type, size, position, and purpose of the equipment. Successively, an association between the equipment model and the site model may be developed to indicate positioning of each equipment at a particular location of the site. Further, relationship between equipment may also be present, for example details of the VAV units and spaces to which particular air handling units are supplying cool air.

At step 606, the models (site model and equipment model) may be synchronized with the cloud network via easy onboarding. Synchronizing the models over the cloud network may involve saving a copy of the models over the cloud network, constantly pushing any update in the models for updating over the cloud network, and ensuring that the models are consistent across different instances or locations.

At step 608, it is determined whether the site is configured to comply with a particular standard, for example Title24 standard. To do so, a repository holding information about different sites and the standards applicable for each site may be accessed. Such repository may either be stored over the cloud network or may be managed by a government body. The repository may be accessed to determine if any standard (energy conservation standard) is applicable for the site.

At step 610, when it is determined that the site is configured to comply with a particular standard, a compliance engine configured over the cloud network is invoked. Invoking the compliance engine over the cloud network refers to a process of accessing and executing a specific functionality or component of a software application hosted on a remote server or cloud infrastructure. Upon invoking, the compliance engine performs the steps 612 through 626 described successively.

At step 612, the compliance engine may read a compliance rule belonging to the standard identified to be applicable for the site. Complete details of the compliance rule may be fetched from the repository.

At step 614, operational data related to the wireless sockets and required models i.e. the site model and the equipment model may be read from respective services. The services refer to software functionalities implemented over the cloud network. The operational data may include, but not limited to, socket health status, alarms, schedule display, energy consumption, firmware, mode of operation, socket outlet alarm actions, and power and current values.

At step 616, the compliance rule read from the repository may be executed. Executing the rule refers to determining whether all requirements/conditions specified under the compliance rule are met at the site or not. Executing the compliance rule may be understood as performing a rule pass or fail check.

At step 618, when the compliance rule is successfully executed i.e. identified to pass, results of execution of the compliance rule may be recorded. The pass condition of the compliance rule would mean that all the requirements/conditions specified under the compliance rule are being met at the site. The results of execution of the compliance rule may be recorded for future use, for example for use during audits.

At step 620, a next compliance rule is selected for execution after a prior compliance rule is identified to pass. In this manner, all compliance rules belonging to the standard are executed until failure of a compliance rule is identified.

At step 622, after failure of a compliance rule is identified, results of execution of the compliance rule may be recorded and recommendations may be provided. For example, in one situation when the compliance rule is that coverage of wireless sockets in an area should at 50% at least and the actual count is less than 50%, the recommendation may be to increase count of the wireless switch so that the compliance rule is fulfilled i.e. passed.

At step 624, it is determined whether the recommendation is automatable. It must be understood that determining whether the recommendation is automatable means determining whether a task required to be performed based on the recommendation is automatable or not. To determine whether the recommendation is automatable, ready availability of complete details of the recommendation and an automation script related to the recommendation may be identified.

At step 626, after it is identified that the recommendation is automatable, configuration of the site may be adjusted automatically. For example, a holiday schedule or an override configuration may be implemented over the wireless sockets installed in the site.

At step 628, after it is determined that the recommendation cannot be automated, a user/operator may be notified about an action required to be taken manually. For example, more wireless sockets may need to be installed on the site to meet the 50% compliance rule.

FIG. 7 illustrates a flow chart of a method of managing operational compliance of wireless sockets, in accordance with an embodiment of the present disclosure. In this regard, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIG. 7 may in fact be executed substantially concurrently or the blocks may sometimes be executed in the reverse order, depending upon the functionality involved. Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

At step 702, a space model and an equipment model of a site may be accessed. The space model provides details of layout of the site and mapping of the site with a plurality of wireless sockets. The equipment model provides position of electrically powered devices present on the site, position of the plurality of wireless sockets installed on the site, and mapping of the plurality of wireless sockets with electrical powered devices.

At step 704, compliance rules applicable for the site may be accessed. The compliance rules applicable for the site may include one or more of areas in which wireless sockets should be installed, minimum coverage of the wireless sockets, deactivation of the wireless sockets upon occupancy of the site by individuals lesser than a predefined count, deactivation of the wireless sockets after a predefined time period when all individuals exit the site, and deactivation of the wireless sockets based on a holiday plan. The compliance rules may be updated based on a change in one or more of the space model and the equipment model.

At step 706, operational data of the plurality of wireless sockets may be obtained. The operational data may comprise at least one of current, voltage, power consumption, time of operation, peak value of power consumption and associated timings, socket temperature, socket health status, and alarms for crossing threshold values.

At step 708, the operational data may be compared with the compliance rules for identifying non-compliance of one or more rules.

At step 710, one or more recommendations to obviate the non-compliance of the one or more rules may be provided to an operator. In one scenario, the one or more recommendations may include installation of wireless sockets at one or more locations identified from the space model. In another scenario, the one or more recommendations may include changing an operating state of one or more of the plurality of wireless sockets at one or more locations identified from the equipment model. The operational state of one or more of the plurality of wireless sockets may be changed based on a user input.

In the above description, for purposes of explanation, numerous specific details are set forth in order to provide a thorough understanding of the present systems and methods. It will be apparent the systems and methods may be practiced without these specific details. Reference in the specification to "an example" or similar language means that a particular feature, structure, or characteristic described in connection with that example is included as described, but may not be included in other examples.

Those skilled in the art will understand that any number of nodes, devices, links, etc. may be used in the cloud network, and that the view shown herein is for simplicity. Also, those skilled in the art will further understand that while the cloud network is shown in a certain orientation, the cloud network is merely an example illustration that is not meant to limit the disclosure. For example "real-world" cloud networks may comprise any type of network, including, among others, Fog networks, IoT networks, core networks, backbone networks, data centers, enterprise networks, provider networks, customer networks, virtualized networks (e.g., virtual private networks or "VPNs"), combinations thereof, and so on. Note further that the network environments and their associated devices may also be located in different geographic locations.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set as claimed in claims that issue from this application, in the specific form in which such claims issue, including any subsequent correction.

I claim:

1. A method of managing operational compliance of wireless sockets, the method comprising:
   accessing a space model and an equipment model of a site, wherein the space model provides mapping of the site with a plurality of wireless sockets, and the equipment model provides mapping of the plurality of wireless sockets with electrical powered devices;
   accessing compliance rules applicable for the site, wherein the compliance rules applicable for the site include one or more of areas in which wireless sockets should be installed, minimum coverage of the wireless sockets, deactivation of the wireless sockets upon occupancy of the site by individuals lesser than a predefined count, deactivation of the wireless sockets after a predefined time period when all individuals exit the site, and deactivation of the wireless sockets based on a holiday plan;
   obtaining operational data of the plurality of wireless sockets, wherein the operational data comprises at least one of current, voltage, power consumption, time of operation, peak value of power consumption and associated timings, socket temperature, socket health status, and alarms for crossing threshold values;
   comparing the operational data with the compliance rules for identifying non-compliance of one or more rules; and
   providing one or more recommendations to obviate the non-compliance of the one or more rules.

2. The method of claim 1, wherein the one or more recommendations include installation of wireless sockets at one or more locations identified from the space model.

3. The method of claim 1, wherein the one or more recommendations includes changing an operating state of one or more of the plurality of wireless sockets at one or more locations identified from the equipment model.

4. The method of claim 3, further comprising:
   receiving a user input for remotely changing the operational state of one or more of the plurality of wireless sockets.

5. The method of claim 1, wherein the space model comprises details of layout of the site and the equipment model comprises position of electrically powered devices present on the site, and the position of the plurality of wireless sockets installed on the site.

6. The method of claim 1, further comprising:
   generating a report indicating failure or success of implementation of the one or more compliance rules, based on the one or more recommendations.

7. The method of claim 1, further comprising:
   updating the compliance rules based on a change in one or more of the space model and the equipment model.

8. A system for managing operational compliance of wireless sockets, the system comprising:
   one or more processors;
   a memory storing program instructions which, when executed by the one or more processors, causes the one or more processors to:
   access a space model and an equipment model of a site, wherein the space model provides mapping of the site with a plurality of wireless sockets, and the equipment model provides mapping of the plurality of wireless sockets with electrical powered devices;
   access compliance rules applicable for the site wherein the compliance rules applicable for the site include one or more of areas in which wireless sockets should be installed, minimum coverage of the wireless sockets, deactivation of the wireless sockets upon occupancy of the site by individuals lesser than a predefined count, deactivation of the wireless sockets after a predefined time period when all individuals exit the site, and deactivation of the wireless sockets based on a holiday plan;
   obtain operational data of the plurality of wireless sockets, wherein the operational data comprises at least one of current, voltage, power consumption, time of operation, peak value of power consumption and associated timings, socket temperature, socket health status, and alarms for crossing threshold values;
   compare the operational data with the compliance rules to identify non-compliance of one or more rules associated; and
   provide one or more recommendations to obviate the non-compliance of the one or more rules.

9. The system of claim 8, wherein the one or more recommendations include installation of wireless sockets at one or more locations identified from the space model or changing an operating state of one or more of the plurality of wireless sockets at one or more locations identified from the equipment model.

10. The system of claim 9, wherein the processor is configured to:
    receive a user input for remotely changing the operational state of one or more of the plurality of wireless sockets.

11. The system of claim 8, wherein the space model comprises details of layout of the site and the equipment model comprises position of electrically powered devices present on the site, and the position of the plurality of wireless sockets installed on the site.

12. The system of claim 8, wherein the processor is configured to:
generate a report indicating failure or success of implementation of the one or more compliance rules, based on the one or more recommendations.

13. The system of claim 8, wherein the processor is configured to:
receive the operational data from one or more gateway controllers connected with the plurality of wireless sockets via one or more connected hubs.

14. The system of claim 13, wherein the one or more connected hubs are network devices configured to provide the operational instructions of the plurality of wireless sockets.

15. The server of claim 13, wherein the one or more connected hubs is connected with the one or more gateway controllers using a wired connection.

16. The system of claim 13, wherein the one or more connected hubs communicate with the one or more gateway controllers using a network protocol.

17. The system of claim 16, wherein the network protocol is Building Automation and Control Networks (BACnet) protocol.

18. A non-transitory computer-readable storage medium storing program instructions for managing wireless sockets, the instructions, when executed, perform the steps of:
accessing a space model and an equipment model of a site, wherein the space model provides mapping of the site with a plurality of wireless sockets, and the equipment model provides mapping of the plurality of wireless sockets with electrical powered devices;
accessing compliance rules applicable for the site wherein the compliance rules applicable for the site include one or more of areas in which wireless sockets should be installed, minimum coverage of the wireless sockets, deactivation of the wireless sockets upon occupancy of the site by individuals lesser than a predefined count, deactivation of the wireless sockets after a predefined time period when all individuals exit the site, and deactivation of the wireless sockets based on a holiday plan;
obtaining operational data of the plurality of wireless sockets, wherein the operational data comprises at least one of current, voltage, power consumption, time of operation, peak value of power consumption and associated timings, socket temperature, socket health status, and alarms for crossing threshold values;
comparing the operational data with the compliance for identifying non-compliance of one or more rules; and
providing one or more recommendations to obviate the non-compliance of the one or more rules.

* * * * *